United States Patent [19]
Knapp et al.

[11] 3,857,132
[45] Dec. 31, 1974

[54] PIPELINE PIG OPERABLE IN TWO DIRECTIONS

[76] Inventors: Kenneth M. Knapp; Charles C. Knapp, both of P.O. Box 2261, Houston, Tex. 77001

[22] Filed: Nov. 24, 1972

[21] Appl. No.: 309,059

[52] U.S. Cl. ........................................ 15/104.06 R
[51] Int. Cl. ............................................. B08b 9/04
[58] Field of Search ............ 15/104.06 R, 104.06 A, 15/104.06 B, 3.5, 3.51; 137/268

[56] References Cited
UNITED STATES PATENTS

| | | | |
|---|---|---|---|
| 2,188,959 | 2/1940 | Schaer | 15/104.06 R |
| 2,576,197 | 11/1951 | Stephens | 15/104.06 R |
| 2,620,037 | 12/1952 | McClendon | 15/104.06 R UX |
| 3,530,523 | 9/1970 | Vernooy | 15/104.06 R |
| 3,704,478 | 12/1972 | Vernooy | 15/104.06 R |
| 3,725,968 | 4/1973 | Knapp et al. | 15/104.06 R |
| 3,740,790 | 6/1973 | Koppes | 15/104.06 R X |

*Primary Examiner*—Edward L. Roberts
*Attorney, Agent, or Firm*—Donald Gunn

[57] ABSTRACT

A pipeline pig which is bi-directionally operable in a pipeline wherein it is forced through the pipeline by fluid flow in the pipeline. Some of the force is delivered to the rear face of the pig to push it. Some of the pressure fluid is introduced into the pig to the central or forward portions to provide a pulling force as well as a pushing force. A check valve mechanism is included so that there is no fluid flow through the pig but rather the check valve directs the pipeline fluid pressure to the front end of the pig to thereby enable the pulling force to be created without regard to the direction of movement. Several embodiments are illustrated including a first embodiment wherein the pig is hollow through its central axis and the hollow chamber is closed by means of a check valve mechanism. Additional embodiments are illustrated wherein the central axial passage is formed with a captured valve element therein, the entire valve being of cast construction.

11 Claims, 6 Drawing Figures

PIPELINE PIG OPERABLE IN TWO DIRECTIONS

PRIOR ART

Class 15, sub-class 104.06

BACKGROUND OF THE INVENTION

In the operation of pipelines, it is necessary to sometimes pass a pig through the pipeline for cleaning. At other times, pipeline pigs are used for separating batches of different chemicals. For instance, a first petrochemical product will be pumped to a pipeline and later a second one will be pumped through the line. The two products are separated by miltiplicity of pigs.

Pipeline pigs are also required for proving various instrumentation systems associated with the pipeline. Moreover, pipeline pigs are often used for cleaning gas lines. For instance, natural gas may be pumped several hundred miles through a pipeline. The pipeline will pass over hill and valley. Quite often, in the valleys, it will pass under a stream and will be substantially cooled. The natural gas flowing through the line may carry some vaporized constituents which will condense on the cool wall of the pipe in the valleys and indeed, liquid can be captured in such valleys to an extent that a condensate trap is made. It is necessary to occasionally pump a pipeline pig through such a gas line to force the liquid condensate out of the pipeline. The liquid condensate is recovered at the other end of the pipeline. Quite often, it has substantial value above and beyond the value of the natural gas.

It is with the foregoing in mind that the present invention has been implemented. The present invention is particularly adapted for use in pipelines of substantial diameter. Pigs used in large diameter pipelines, for instance two feet and greater, will weigh several hundred and indeed several thousand pounds. The pig cannot be easily handled at the time of launching or at the time of recovery. Moreover, it is quite often desirable that a pig be bi-directional in operation. It may be used in a short, large diameter pipeline where the flow is apt to be reversed. Most pigs presently available are operable only in one direction. This means that they must be removed from the pipeline through recovery apparatus which is complicated and often difficult to operate. They must then be lifted and rotated through 180° and returned to the pipeline. This is quite difficult for large pigs because of their weight.

The present invention overcomes this problem. The present invention discloses a pig which is operable in two directions. Moreover, the present invention contemplates the use of a bi-directional pig in a manner which permits its reversal in a very simple manner.

SUMMARY OF THE PRESENT INVENTION

The present invention contemplates a pig which is particularly adapted for use in large diameter pipelines. The pig of the present invention preferably includes spiral grooves causing it to rotate. The grooves engage the periphery of the pipe. This prevents the accumulation of wear on one side. Lateral wiping fins are also included. A number of such lateral fins extend outwardly from a central body which has a hollow axial passage. The axial passage extends from the front face to the back face of the pig. The axial passage is closed over at both the front and back faces. The front and back faces are preferably recessed so that the pushing force which propels the pig through the pipeline is delivered somewhat forward of the rear end of the pig. The central passage is closed by check valve mechanisms, preferably located at each end. The central passage is communicated with the pipeline pressure so that the pressure acts on the forward most check valve mechanism to impart a force to the forward face. In other words, a pushing force on the rear face is created and additionally a pulling force on the forward face is also created. These two forces tend to avoid the problem of compression lengthwise of the pig which causes erratic variations in wear.

In a first embodiment, the front and rear faces are defined by metal plates which close over the axial passage and which include check valve mechanisms therein. In additional embodiments, the pigs are preferably formed of resilient material and thus require no assembly. The valve element is molded in the central passage and is captured therein.

DESCRIPTION OF THE PREFERRED EMBODIMENTS

Figure 1:
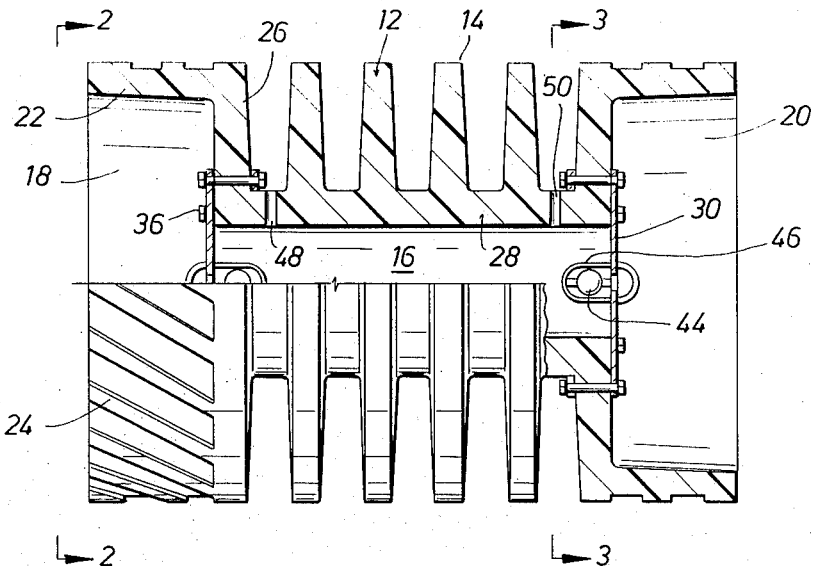
FIG. 1 is a side view, partly in section of one embodiment of a pipeline pig in accordance with the present invention including check valves at both end enabling bidirectional movement of the pig.

Attention is first directed to FIG. 1 of the drawings where the numeral 10 identifies a bi-directional pipeline pig in accordance with the teachings of the present invention. The pig 10 incorporates an encircling outer fin or rib generally indicated at 12 and a similar fin is shown at 14. A deep groove is cut between the adjacent fins. The number of fins can range upwardly to any desired number and perhaps four to six would be an optimum range. The fins 12 and 14 surround an axial passage 16 which extends from what will be called a rear, recessed cavity 18 and a similar front recessed cavity 20. The cavities 18 and 20 are similar. Depending on the direction of translation, one cavity will lead and the other will follow. Inasmuch as the device is symmetrical, it will be observed that the nomenclature of rear and front is merely for convenience of description and is no limitation on the operations of the present invention.

Attention is directed to the lefthand side of FIG. 1 where the rear cavity 18 is found. It has a surrounding lip 22 which extends rearwardly from the body to define the cavity 18. The lip 22 has an outer face which is grooved at 24 with a number of spiraled grooves or markings. The spirals or grooves engage the pipe and cause the pig to rotate slightly so that the wear on the exterior surface is evenly distributed. The grooves 24 extend along the length of the lip 22. The lip 22 is joined to a planar fin 26 which is similar to the fins 12 and 14 except for the addition of the lip 22. The fin 26 extends inwardly to a cylindrical body 28 which extends the length of the pig from cavity to cavity. The cylindrical body 28 is hollow at 16 as previously mentioned. The central passage 16 opens through the fin 26 into the cavity 18. The same is true at the other end. As will be observed, the passage 16 communicates with the front and rear cavities 18 and 20 except that they are closed as will be described.

Figure 2:
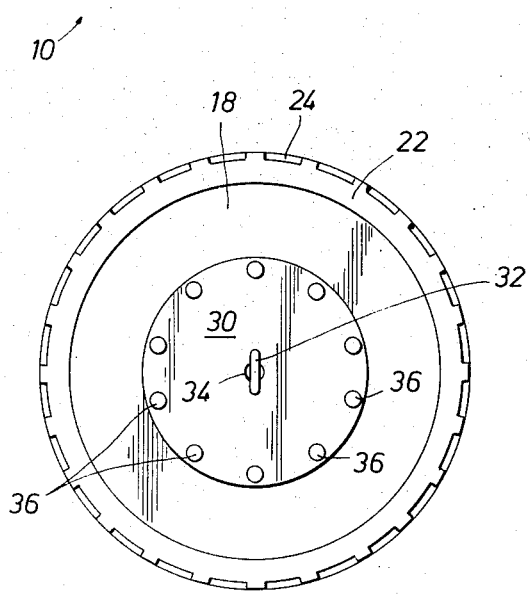
FIG. 2 is an end view of the pig shown in FIG. 1.
Figure 3:
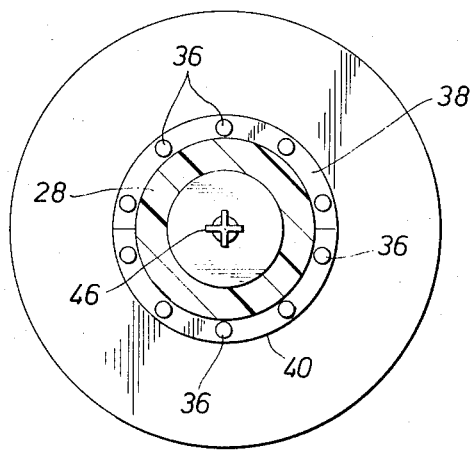
FIG. 3 is a sectional view taken along the line 3—3 of FIG. 1 showing details of construction of a metal ring which is adapted to secure an end plate to the pig.

Attention is directed to FIG. 2 of the drawings which discloses a closure plate 30. The plate 30 has a lift ring 32 at its center. Moreover, a central opening 34 is formed in the closure plate 30. The plate 30 is secured to the pig to close the passage 16 by a number of bolts which are indicated at 36. A suitable number of bolts are located about the periphery of the plate. The bolts 36 extend through the first fin 26. The bolts 36 extend through holes drilled in the first fin 26 and engage a lock ring which is better illustrated in FIG. 3. FIG. 3 shows a two piece lock ring which pieces are indicated by the numerals 38 and 40. The two piece lock ring provides a bearing surface for the bolts 36. It will be appreciated that substantial tension is placed on the bolts. The bolts bear against the closure plate 30 that is exposed in the cavities 18 and 20. An equal and opposite force is placed on the lock ring. The lock ring thus distributes the force and prevents the bolts from pulling through at the holes which are drilled in the resilient material of the pig.

Attention is directed to the cover plate 30 at the right hand end. It will be observed to include an opening 34. The numeral 44 identifies a valve element which is held in position by a cage 46. The cage 46 surrounds and holds the valve element 44 adjacent to the opening 34. On viewing FIG. 1, it will be observed that fluid flow from the left to the right as might occur in a pipeline passes through the check valve arrangement at the lefthand end or at the rear end of the pig. However, the fluid flow is introduced into the internal axial passage 16 and forces the valve element 44 against the opening 34 to close the opening. This prevents fluid flow through the pig. In the event of fluid flow in the pipeline from right to left as viewed in FIG. 1, the opposite occurs. Namely, the check valve at the righthand side opens up to permit the flow of fluid past the valve element 44. However, the lefthand check valve closes. This prevents fluid flow through the pig in the other direction.

In FIG. 1, the numerals 48 and 50 identify lateral passages. The passages extend through the pig body 28. The significance of these passages will be understood hereinafter.

In operation, the pig 10 shown in FIG. 1 is introduced into a pipeline. For purposes of description, first presume that flow is from left to right as viewed in FIG. 1. The flow impinges on the rear face 18 of the pig and tends to push the pig. The pig is normally formed of resilient material, the preferred material being polyurethane of a density of somewhere between about 4 and 40 pounds per cubic foot and a hardness ranging anywhere from about 30 to 90 durometer. The resilient material when pushed from the rear tends slightly to compress along its longitudinal axis. When it compreses, this causes it to enlarge slightly. As it enlarges, excessive contact with the periphery might be encountered. A tendency to hang sometimes occurs when the pig is compressed and thereby enlarged. When this occurs, the pig tends to wear somewhat faster.

The pig is forced through the pipeline by the flow from left to right. It tends to rotate by virtue of the grooves which are found on the lip 22. This enables the pig to wear smoothly all about its circumference. In addition, fluid is introduced into the central passage 16. It flows past the lefthand check valve into the passage. The righthand check valve closes. As a consequence, a force is created acting on the cross-sectional area of the end plate 30 which closes the passage 16. This force is a function of the pressure differential across the pig and also the cross-sectional area of the passage 16. This force tends to propel the pig along the pipeline. This force is a pulling force acting on the pig which in conjunction with the pushing force at the rear, tends to enable the pig to maintain its normal length. In other words, axial compression is reduced because the propelling force is in part a pulling force at the front end of the pig. This pulling force thus avoids the problem of axial compression and avoids the problem of axial compression and radial expansion. In addition, fluid under pressure is introduced by the passages 48 and 50 into the vicinity of the cleaning fins 12 and 14. This also provides a pulling force at intermediate points along the length of the pig and thereby tends to reduce the bunching or chattering tendency of the pig as it traverses the pipeline. The passage 50 introduces fluid under pressure to the back side of the front most fin. This particularly helpful in moving the pig through the pipeline.

Flow through the pipeline in the opposite direction causes the apparatus to function in the opposite manner but this operation is exactly the same as the foregoing operation. The only difference is the direction of movement of the pig and the operation of the check valve. In other regards, the foregoing description holds true for movement in the second direction.

Figure 4:
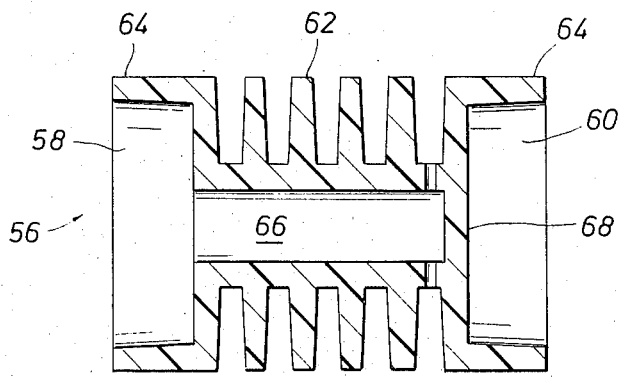
FIG. 4 is a lengthwise sectional view through a pig formed of resilient material.

Attention is next directed to FIG. 4 of the drawings which discloses a pig which is formed fully of resilient materials, preferably polyurethane in the preferred embodiment, and which has no metal components. In FIG. 4, the embodiment is indicated generally by the numeral 56. The pig 56 has a lefthand cavity 58 and a right hand cavity 60. It includes a number of fins 62 and front and rear lips 64. The lips 64 and the fins 62 are similarly or even identical to those shown in FIG. 1.

The numeral 66 identifies an axial passage which is open at one end and which is closed over at 68 at the other end. It will be observed that the pig 56 is not symmetrically constructed in that the passage 66 is fully open at one end and is fully closed at the other. No check valves are included in this embodiment.

The pig 56 shown in FIG. 4 traverses from left to right in a pipeline with both a pushing and pulling action on the pig. The flow of fluid in the pipeline impinges on the lefthand end and pushes the pig. The full pressure differential across the pig is also developed across the member 68 which closes the passage 66. Also, the passages opening into the fins and preferably behind some of the fins introduce pressure fluid so that an additional pulling force is created. On movement from left to right as viewed in FIG. 4, both a pulling and a pushing force is created. This tends to avoid the lengthwise compression of the pig and the consequental radial expansion.

On movement from right to left, only a pushing force is created in the embodiment 56. Movement from right to left is accompanied by only a pushing force which possibly creates the lengthwise compression mentioned above. In that event, the pig may tend to wear somewhat faster on movement from right to left.

Figure 5:
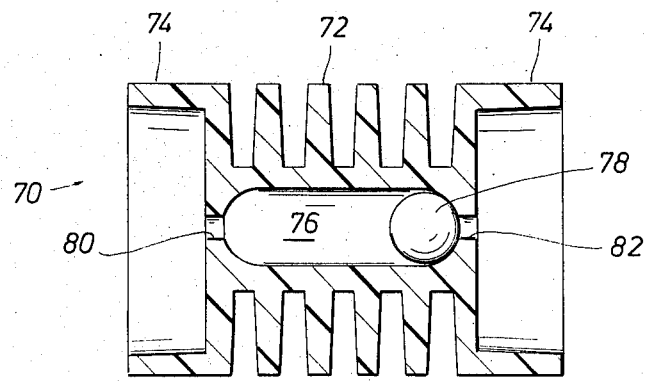
FIG. 5 illustrates an alternative embodiment to the structure of FIG. 4 wherein a pig is formed of all resilient material and captures a valve element therein which moves from one end to the other enabling the pressure fluid of the pipeline to act on two faces so that the pig is both pushed and pulled; and, FIG. 6 is a view of a structure similar to FIG. 5 showing an alternative embodiment of the valve element captures within the pig to serve as a check valve.

Attention is next directed to FIG. 5 of the drawings which shows a further embodiment indicated by the numeral 70. It too incorporates fins 72 and front and rear lips 74. It has a central passage 76 which extends from end to end. The passage 76 captures a valve element 78 which is free to move the length of the passage 76.

In FIG. 5, the passage 76 communicates to a small opening 80 to the left and to a small opening 82 to the right. The axial openings 80 and 82 expose the passage 76 to the fluid flowing in the pipeline. The passages 80 and 82 introduce fluid flow into the central passage 76 to cause the valve element 78 to move to the opposite ends. The passage 76 is slightly larger than the valve element 72 which is larger than the passages 80 and 82. Thus, the valve seats are defined at the opposite ends of the passage 76. The valve seats engage the valve 78 which thereby functions as a check valve.

In operation, the embodiment of FIG. 5 functions similarly to the embodiments shown in FIG. 1. That is to say, a pushing force is created in part at the back end of the pig. Additionally, however, fluid under pressure is introduced to the central passage 76 and impinges on the valve element, thereby creating a pulling force acting on the pig as it translates the pipeline. In other words, the arrangement shown in FIG. 5 comprises a two check valve system wherein only one valve element is used. The valve is triggered into a checking position by means of fluid flow through the pipe. Moreover, the valve moves from right to left or left to right in response to this fluid flow. The device is symmetrical in operation, inferring that an equal pulling force is created without regard to the direction of movement of the pig.

The pig of FIG. 5 is manufactured through the use of an appropriately shaped mold wherein the valve element 78 is inserted into the mold first and thereafter surrounded by a removable or dissolvable mold core having the shape of the passage 76. The mold core surrounds the valve element 78. For instance, the valve element 78 can be located at the center of the core and casting of the pig about the core will shape the passage 76 in the illustrated manner. It will also leave the passages 80 and 82 formed in the illustrated manner.

Figure 6:
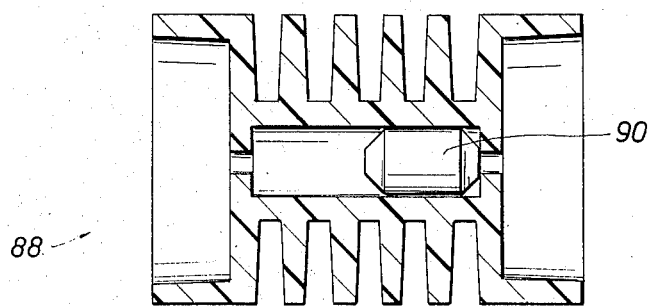

Attention is next directed to FIG. 6 of the drawings which illustrates even another embodiment indicated by the numeral 88. The embodiment 88 is similar in construction to the embodiment 70 shown in FIG. 5. Basically, the significant difference in the embodiment 88 is the shape of the valve element 90. As opposed to the sphere 78 shown in FIG. 5, the valve element 90 is an elongate plug which is preferably tapered to fit against the passages at opposite ends of the pipeline pig 88. In other words, the pig is similar in all regards and operates in all regards like the pigs previously described. The only difference is the shape of the valve element which is sometimes easier to fabricate in comparison with the sphere 78. Again, the pig 88 is fabricated in the same manner as that described for the pig 70. That is to say, the valve element 90 is captured in a central core which is placed in an appropriately shaped mold. When the mold is filled, the core surrounded by the resilient material prior to hardening and after it is cured, the core can be removed either by dissembling or by the use of a soluble core.

The operation of the pigs 70 and 88 is believed readily apparent from the description of the foregoing embodiments.

The pig 56 can be modified by relocating the closure member 68 at a point in the acial passage 66 which does not coincide with the end face. For instance, the closure member 68 can be located centrally of the passage 66. In that event, it will create symmetrical forces on movement in either direction. In addition, the benefit of both pushing and pulling forces is not lost although the pulling force may be somewhat recuded. The device still functions successfully in the manner previously described.

The foregoing is directed to alternative embodiments of the present invention.

The scope of the present invention is determined by the claims which are as follows:

1. A pig for use in a pipeline comprising:
   a body formed of resilient material and having at least one outwardly directed fin which is adapted to contact the internal periphery of a pipe;
   said pig body further including a forward and rearward facing surface adapted to contact the internal periphery of a pipe and across which a pressure differential in the pipeline creates a pushing force enabling the pig to travel through the pipeline; and, passage means in said pig extending between said faces and including a blockage means cooperating with said passage means to admit fluid pressure from one face of said pig body to create a pulling force acting on said body away from said one face which receives a pushing force from pressure differential and wherein said blockage means acts selectively at either end to form a pulling force at least one-half the length of said body from the pushing force.

2. The invention of claim 1 wherein the pig includes at least one external surface having a plurality of spiraled means on the exterior thereof adapted to engage the periphery of the pipe and tending to impart rotation to the pig as it translates the pipeline.

3. The invention of claim 1 including a plurality of fins extending outwardly from said body and including a passage opening between two adjacent fins from said passage means.

4. A pig for use in a pipeline comprising:
   a body formed of resilient material and having at least one outwardly directed fin which is adapted to contact the internal periphery of a pipe;
   said pig body further including a forward and a rearward facing surface adapted to contact the internal periphery of a pipe and across which a pressure differential in the pipeline creates a pushing force enabling the pig to travel through the pipeline; and
   a passage means along the central axis of said pig body and opening at both ends of said body; and, separate closure means for both ends of said passage means, each including a check valve means limiting flow to one direction past said valve means.

5. The invention of claim 4 wherein the pig includes at least one external surface having a plurality of spiraled means on the exterior thereof adapted to engage the periphery of the pipe and tending to impart rotation to the pig as it translates the pipeline.

6. The invention of claim 4 wherein said closure means comprises a closure plate.

7. The invention of claim 6 wherein said closure plate is attached by a plurality of bolts which extend through at least one fin of said pig and engage a lock ring on the opposite side thereof.

8. A pig for use in a pipeline comprising:
   a body formed of resilient material and having at least one outwardly directed fin which is adapted to contact the internal periphery of a pipe;
   said pig body further including a forward and a rearward facing surface adapted to contact the internal periphery of a pipe and across which a pressure differential in the pipeline creates a pushing force enabling the pig to travel through the pipeline;
   a passage means along the central axis of said pig body and opening at both ends of said body;
   a valve element in said passage means; and,
   said valve element being constructed and arranged to move from end to end of said passage means to selectively close said passage means and prevent flow therethrough.

9. The invention of claim 8 including a bypass passage from the exterior of said body to said passage means.

10. The invention of claim 8 wherein said passage means includes valve seat means at the ends thereof and adjacent to said openings to prevent flow through said openings.

11. The invention of claim 8 wherein the pig includes at least one external surface having a plurality of spiraled means on the exterior thereof adapted to engage the periphery of the pipe and tending to impart rotation to the pig as it translates the pipe.

* * * * *